(12) United States Patent
Vide

(10) Patent No.: US 6,854,544 B2
(45) Date of Patent: Feb. 15, 2005

(54) SHUTTER FOR CLOSING OPENINGS WITH PIVOTAL SHUTTER ELEMENTS

(75) Inventor: Marko-Dejan Vide, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/179,154

(22) Filed: Jun. 26, 2002

(65) Prior Publication Data

US 2003/0029581 A1 Feb. 13, 2003

(30) Foreign Application Priority Data

Jul. 2, 2001 (AI) ......................................... GM527/2001

(51) Int. Cl.$^7$ .............................................. B60K 11/04
(52) U.S. Cl. ..................................... 180/68.6; 180/68.1
(58) Field of Search .............................. 180/68.1, 68.2, 180/68.3, 68.6, 69.21, 68.4, 69.22, 69.24; 165/98; 454/286, 335, 336; 123/41.04, 41.58, 41.07; 49/73.1, 74.1, 77.1, 80.1, 92.1, 371

(56) References Cited

U.S. PATENT DOCUMENTS

| 657,367 A | * | 9/1900 | Starck ......................... 49/90.1 |
|---|---|---|---|
| 1,393,917 A | * | 10/1921 | Snell ........................ 123/41.05 |
| 1,576,507 A | * | 3/1926 | Eliasek ..................... 123/41.04 |
| 1,807,165 A | * | 5/1931 | Mueller ....................... 49/86.1 |
| 2,248,094 A | * | 7/1941 | Kysor ....................... 236/35.3 |
| 2,413,770 A | * | 1/1947 | Knoy ........................ 123/41.04 |
| 3,543,838 A | * | 12/1970 | White .......................... 165/160 |
| 3,736,858 A | | 6/1973 | Mercier |
| 3,759,056 A | * | 9/1973 | Graber ......................... 165/271 |
| 4,753,288 A | | 6/1988 | Harvey |
| 4,924,826 A | * | 5/1990 | Vinson ...................... 123/41.05 |
| 5,191,735 A | * | 3/1993 | Ross ........................... 49/74.1 |
| 5,490,353 A | * | 2/1996 | McLaughlin ................... 49/64 |
| 5,853,323 A | * | 12/1998 | Beck et al. .................. 454/156 |
| 5,921,028 A | * | 7/1999 | Marocco ...................... 49/92.1 |
| 6,142,108 A | * | 11/2000 | Blichmann ............... 123/41.05 |
| 6,145,251 A | * | 11/2000 | Ricci .......................... 49/82.1 |
| 6,296,564 B1 | * | 10/2001 | Arold et al. ................. 454/156 |
| 6,475,077 B2 | * | 11/2002 | Arold .......................... 165/42 |
| 6,588,380 B2 | * | 7/2003 | Ries-Mueller ........... 123/41.05 |

FOREIGN PATENT DOCUMENTS

| DE | 3734190 A1 | * | 4/1989 | .......... B60K/11/04 |
|---|---|---|---|---|
| DE | 19742730 | | 4/1998 | |
| DE | 19943822 | | 3/2001 | |
| EP | 0163986 | | 12/1985 | |
| EP | 605325 A1 | * | 12/1993 | ............ F28F/27/00 |
| FR | 2374597 | | 7/1978 | |
| GB | 580093 | | 8/1946 | |
| GB | 2131150 A | * | 6/1984 | ............ F28F/13/06 |

* cited by examiner

Primary Examiner—Christopher P. Ellis
Assistant Examiner—Hau Phan
(74) Attorney, Agent, or Firm—Dykema Gossett PLLC

(57) ABSTRACT

A shutter for closing openings with pivotal shutter elements, the rotational axes of which are arranged parallel to each other. Better sealing is achieved in that the shutter elements consist of at least two wings that are solidly joined together and arranged almost parallel to each other. The wings of the shutter elements are oriented substantially parallel to an imaginary plane of the opening, thus closing it on both sides, in a first position and substantially normal to the plane of the opening, thus clearing said opening, in a second position.

9 Claims, 3 Drawing Sheets

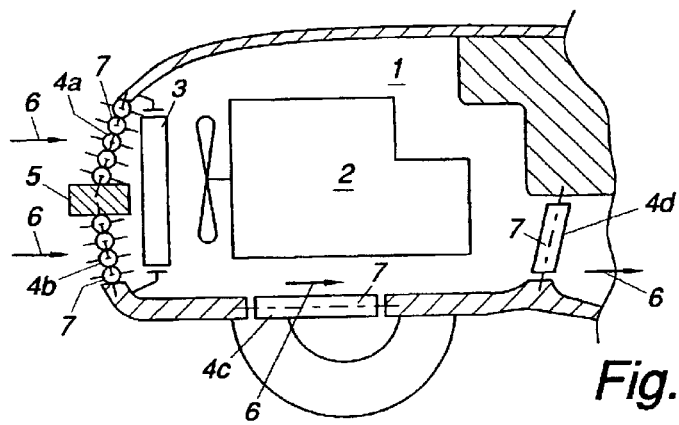
*Fig. 1*
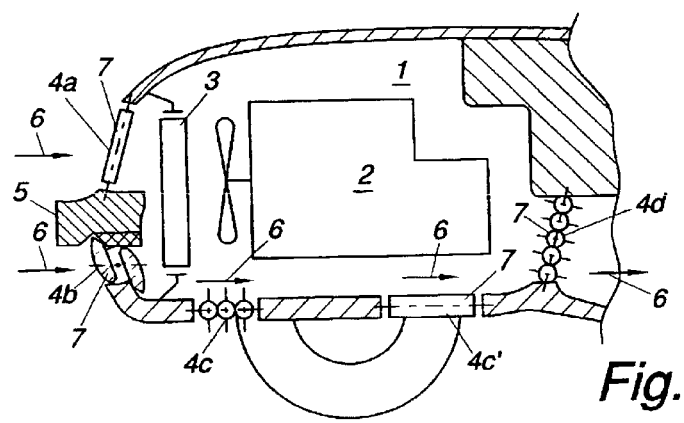
*Fig. 2*
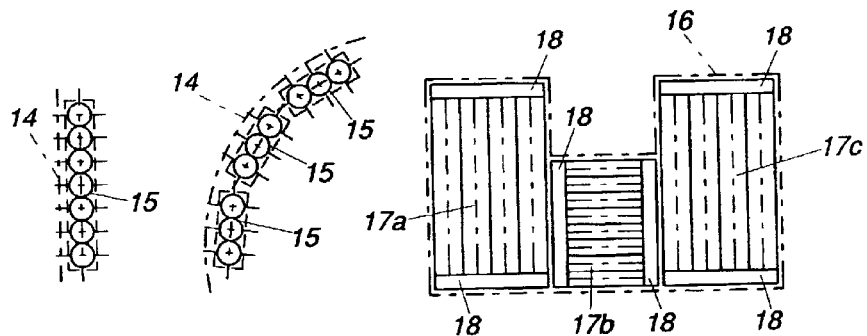
*Fig. 5a*  *Fig. 5b*  *Fig. 6*

SHUTTER FOR CLOSING OPENINGS WITH PIVOTAL SHUTTER ELEMENTS

BACKGROUND OF THE INVENTION

The invention relates to a shutter for closing openings with pivotal shutter elements, the rotational axes of which are arranged parallel to each other.

DESCRIPTION OF PRIOR ART

Shutters in the form of Venetian blinds are mainly used to let in more or less light into a room. If the slats are provided with sufficient rigidity, such Venetian blinds may also be used to perform a change in the ventilation of buildings, vehicles or the like. An appropriate opening is thereby closed by the slats in one position. In rotating the slats about 90° on paralleled axes, the opening may be cleared to allow free air flow. A shutter of this type is described in EP 0 163 986 A and is provided for covering the radiator of an internal combustion engine for the purpose of controlling the temperature of the engine.

Although a shutter having a structure as described herein above is suited to largely inhibit air flow in its closed position, it is difficult to achieve a reliable seal therewith. Furthermore, additional losses occur by thermal conduction and radiation.

Similar disadvantages are found in the device for regulating an air flow as it is described in DE 197 42 730 A1. The device mentioned permits to control the air flow for a heat exchanger of a vehicle, a plurality of valves being supported in such a manner that they are pivotal about parallel axes and a control unit being provided for opening and closing them. However, cooling losses by thermal conduction or radiation cannot be efficiently minimized with a device of this type.

U.S. Pat. No. 4,753,288 A presents a shutter assembly provided with several rotatable shutter elements whose rotational axes are oriented parallel to each other. In a first position, the rotatable shutter elements are oriented substantially parallel to the plane of the opening to be closed and form a one-layered shutter for the opening. In a second position pivoted 90.degree., the various shutter elements are oriented substantially parallel to the direction of the air flow and oppose to said air flow the least possible drag. The disadvantage of this shutter element is the poor acoustic insulation and the cooling loss by thermal conduction or radiation in the closed position.

In this context, an air vent e.g., for venting the passenger compartment of a vehicle has been disclosed in U.S. Pat. No. 3,736,858 A, an element of which, which is rotatable on an axis, is provided with an outer contour shaped like a circular cylinder, wherein said element can be utilized as a nozzle in one position and as a diffuser when rotated 180.degree. For this purpose, the rotatable element is provided with flow guide elements for divergent diffusion or convergent projection of the flow in function of the rotational position of said guide elements.

SUMMARY OF THE INVENTION

It is the object of the present invention to avoid these drawbacks and to develop a shutter or a shutter system that is provided with the best possible thermal values. More specifically, it is intended to find advantageous application in vehicles with thermal encapsulation of the engine where experience has shown that the control units for incoming and outgoing air constitute the weakest point.

In accordance with the invention, the solution to these objects is to provide the shutter elements with at least two wings that are solidly joined together and arranged almost parallel to each other, the wings of the shutter elements being oriented substantially parallel to the plane of the opening, thus closing it on both sides, in a first position and substantially normal to the plane of the opening, thus clearing said opening, in a second position.

In this way, in the closed condition, the seal may be enhanced, which generally leads to a reduction of the cooling losses. When using the shutter as a radiator shutter in a vehicle, a reduction in drag is additionally achieved when said shutter is mounted on the side of the incoming air, fuel consumption being lowered as a result thereof. This applies more specifically in the case in which the shutter elements described are mounted directly in place of the conventional radiator grill (or instead of the air inlets provided in the body of the vehicle and which are usually covered by slats). Particular thermal properties and excellent thermal and acoustic insulation may be achieved in that, in the first position, the first wings of the shutter elements are adjacent, closing the opening, and the second wings of the shutter elements are also adjacent and also close the opening, a closed air space being thus formed between the first and the second wings. As a result thereof, a closed air space is obtained between two already well insulated rows of elements or wings, so that said air space is well insulated, too.

It is furthermore advantageous if, in the second position, the first wing of a shutter element is adjacent the second wing of a neighboring shutter element, more specifically if the first wing of a shutter element fits into the second wing of a neighboring shutter element in such a manner that the contours of the two wings combine to form one component part from a fluidic point of view. In this way, both a large cross-section of the opening can be realized and the flow resistance minimized.

If the fluidic geometry is favorable, ease of manufacturing can be achieved in having the outer contour of the wings consisting at least partially of sections shaped like a circular cylinder. In case the shutter's width is larger (i.e., the wings longer) it may be necessary to provide stiffening ribs between the wings and/or the final discs of a shutter element. Said stiffening ribs may be configured either as individual ribs or as a grid. As long as they are disposed in planes oriented parallel to the direction of flow, they are not problematic from a manufacturing nor from a fluidic standpoint.

The present invention is furthermore related to an internal combustion engine with a radiator through which air is flowing. In accordance with the invention, the internal combustion engine is characterized in that a shutter of the type mentioned herein above is provided to cover the radiator—said shutter being arranged both in front of the vehicle's radiator (incoming air) and behind and/or underneath the internal combustion engine (outgoing air).

BRIEF DESCRIPTION OF THE DRAWINGS

The invention will be better understood upon reading the following description of embodiments illustrated in the Figs.

FIG. 1 and FIG. 2 are diagrammatic sectional views of some possibilities of mounting the shutter of the invention in the region of the engine compartment of an internal combustion engine.

FIGS. 5a and 5b are sectional views of possibilities of adjusting the shutter mentioned to various surfaces.

FIG. 6 is an elevational view representing a possibility of covering a surface with irregular boundaries by means of the shutter mentioned.

DETAILED DESCRIPTION OF THE PREFERRED EMBODIMENTS

Figure 3:
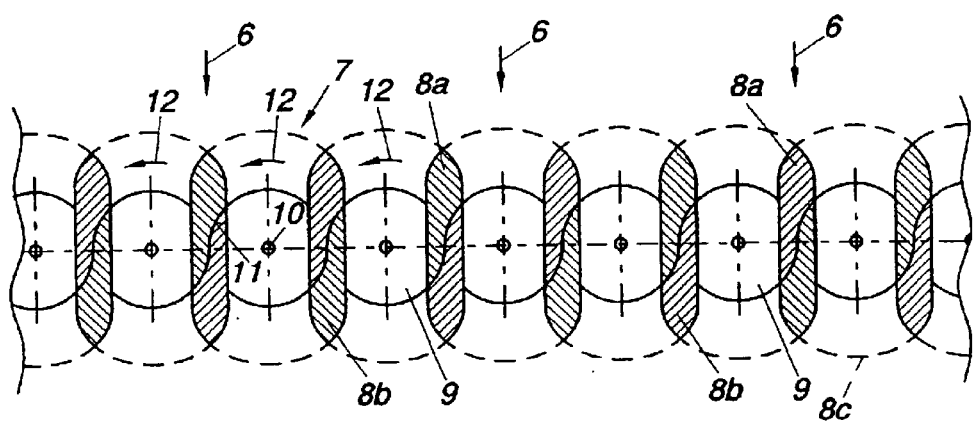
FIG. 3 and FIG. 4 show details of such a shutter in a first and in a second position.

FIGS. 1 and 2 illustrate a detail of the engine compartment 1 of a vehicle that is not shown in detail herein and that accommodates an internal combustion engine 2, both showing possible examples of how to arrange the shutters of the invention. Air is flown through the radiator 3 of the internal combustion engine 2 via first and second openings 4a, 4b arranged above or underneath a bumper 5. Outgoing air leaves the engine compartment through opening 4d. The respective ones of the openings 4c (FIG. 1) and 4c and 4c' (FIG. 2) may represent cross-sections for both incoming and outgoing air.

In FIG. 1, the clear cross-sections of the two incoming air openings 4a and 4b may be regulated by means of a shutter provided with shutter elements 7 that are oriented horizontally transversely to the direction of flow (arrows 6). The same applies for the openings 4c and 4d (the opening 4d at least constituting an opening for outgoing air) except that here, the shutter elements 7 or the slats of the shutter are oriented in a different way: 4c is oriented substantially horizontally in the direction of flow, 4d substantially vertically transversely to the direction of flow.

FIG. 2 illustrates a situation that is quite the same as that shown in FIG. 1, but for the varied arrangement of the shutter (variation in way, orientation and number):

1. The shutter elements 7 of opening 4a are oriented vertically and transversely to the direction of flow.
2. The opening 4b is only closed with a shutter element 7 consisting of two wings.
3. More than but one opening is shown in the bottom region (here 4c and 4c'); the shutter elements can be oriented horizontally and both transversely (4c') and longitudinally (4c) relative to the direction of flow (arrow 6).

FIG. 3 shows the shutter in the opened position, the flow following the direction shown by the arrows 6. Each shutter element 7 consists of a first wing 8a and of a second wing 8b which are fastened by their respective two ends to a common disc 9 and are rotatable about an axis 10 as one unit. The outer contours of the wings 8a, 8b are made to match together so that they form, in the opened position, a smooth body presenting little drag. It is thereby of some help that the wings 8a, 8b consist, on their contacting faces, at least partially of sections 11 shaped like circular cylinders.

Figure 4:
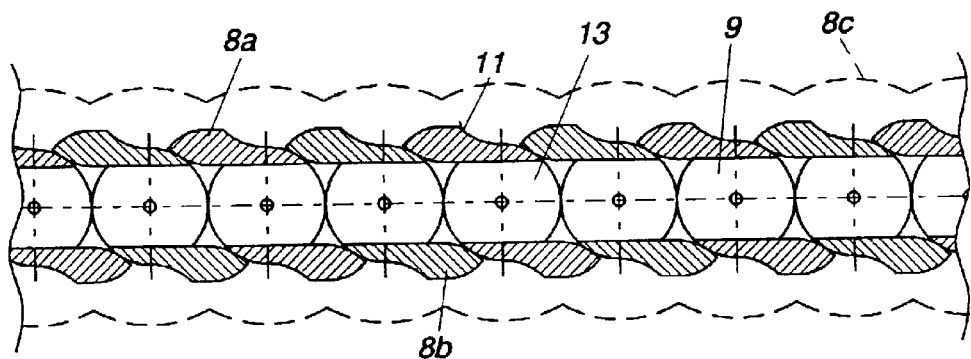

The position of FIG. 4 is achieved by pivoting in synchronism the shutter elements 7 about 90.degree. in the direction of the arrows 12. In this position, the first wings 8a of all of the shutter elements 7 are closely adjacent and the second wings as well, a closed air space 13 being formed therein between. Double seals provide for good sealing and, additionally, optimal thermal and acoustic insulation. The curve 8c, shown in dash-dot line in the two FIGS. 3 and 4, approximately represents the space needed for handling the shutter mentioned.

Two cross-sections through shutter arrays are illustrated in the FIGS. 5a and 5b. They illustrate the possibility to form, with the shutter or the shutter packets 15 mentioned, both straight (FIG. 5a) and curved areas (FIG. 5b: shown in dash-dot line 14 in a sectional view thereof).

FIG. 6 shows a possibility of how to close an opening with irregular boundaries (dash-dot line 16) by means of several independent shutter packets 17a, 17b, 17c. The dark beams represent approximately the space required for the synchronous drive 18 of the shutter elements 7.

Figure 7:
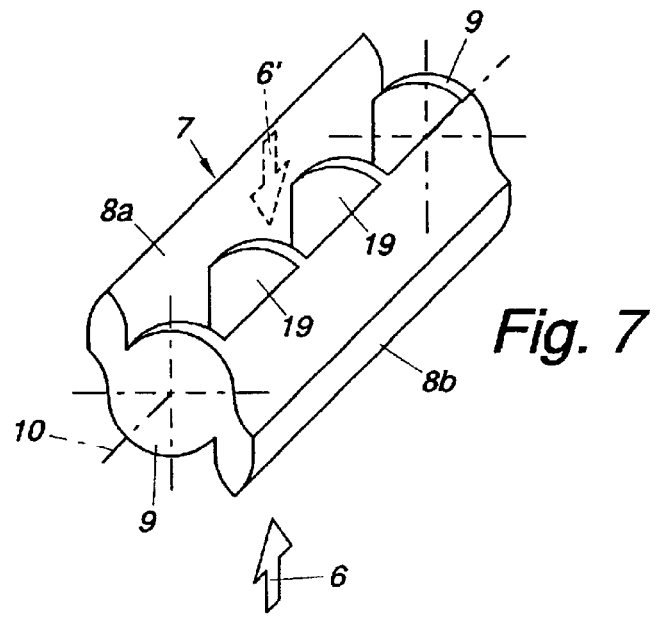
FIG. 7 and FIG. 8 finally illustrate elements of the shutter mentioned together with advantageous arrangements of stiffening ribs.
Figure 8:
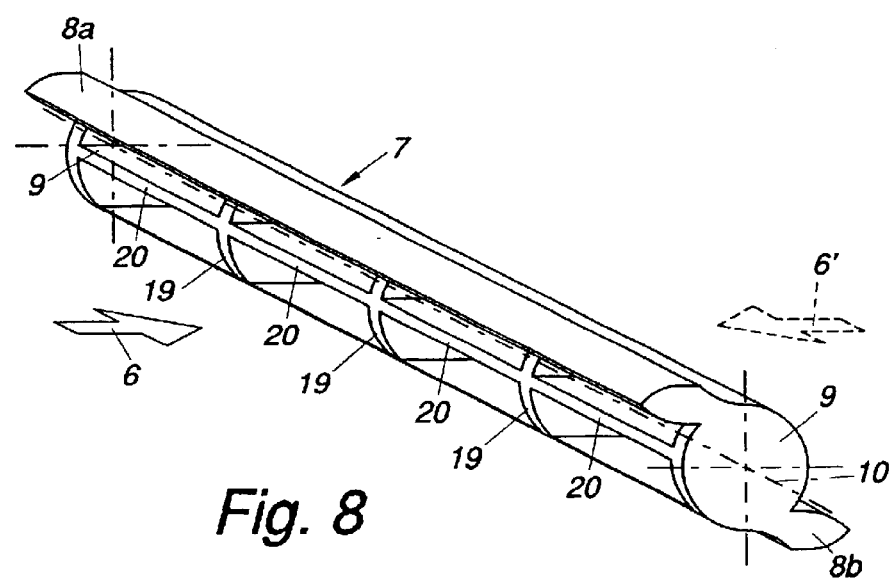

FIG. 7 and FIG. 8 are three-dimensional enlarged views of shutter elements 7. The shape and position of the wings 8a, 8b of the two end discs 9 and the position of possibly necessary stiffening ribs 19, 20 can be surveyed therefrom. The direction of flow therethrough is indicated by arrows shown in full outline 6 or in a dash-dot line 6'. When the shutter element 7 is completely open, the two directions of flow are equivalent.

FIG. 7 shows a shutter element having e.g., some stiffening ribs 19 that are only parallel relative to the end discs 9. The embodiment according to FIG. 7 is only an example—number and position of the stiffening ribs are not limited to those of this embodiment.

The above applies in an analog manner to FIG. 8 in which stiffening ribs 20 are added to the stiffening ribs 19 encountered in FIG. 7. They are arranged substantially parallel to the shutter wings 8a, 8b and, as a result thereof, approximately normal to the stiffening ribs 19.

Generally speaking, the present invention is suited for all the applications in which openings are to be closed by choice and in which the use of conventional shutters is not satisfactory. Such shutters are more particularly suited to influence cooling of vehicle engines. It is accordingly possible to use the invention for venting engine encapsulations. Any engine encapsulation performed for thermal and/or acoustic reasons naturally has its weak points in the control units for the rate of coolant air flow which is absolutely necessary, at least at times. The type of shutter described herein above has clear advantages, both on the side of the incoming air and on the side of the outgoing air, mainly in thermal applications in which it is important that, in a closed condition, a good insulation and an outer contour which allows for convenient flow be provided and in the open condition the flow losses be the lowest possible and the cross-sectional area of the flow path large and free.

What is claimed is:

1. A shutter assembly for use with an opening leading to an internal combustion engine comprising pivotal shutter elements having rotational axes which are arranged parallel to each other, wherein each of said shutter elements comprises at least first and second wings solidly joined together and arranged almost parallel to each other, in a first position of said shutter elements said first and second wings are oriented substantially parallel to an imaginary plane defined by said opening, said first wings of said shutter elements being adjacent one another to form a first wing layer that closes said opening, and said second wings of said shutter elements being adjacent one another to form a second wing layer that also closes said opening, a closed air space being thus formed between said first and second wing layer, and in a second position of said shutter elements said first and second wings are substantially normal to said imaginary plane, thus clearing said opening.

2. The shutter assembly according to claim 1, wherein in said second position, said first wing of one shutter element is situated adjacent said second wing of a neighboring shutter element.

3. The shutter assembly according to claim 2, wherein said first wing of a shutter element fits into said second wing of a neighboring shutter element in such a manner that outer contours of said first and second wings combine to form one flow supplying component.

4. The shutter assembly according to claim 2, wherein, in said second position, said adjacent wings are provided with a smooth outer contour.

5. The shutter assembly according to claim 1, wherein an outer contour of said wings consists at least partially of sections shaped like a circular cylinder.

6. The shutter assembly according to claim 1, wherein stiffening ribs are arranged between said wings of said shutter elements.

7. An internal combustion engine with a radiator through which air is flowing, comprising at least one shutter assembly comprising pivotal shutter elements having rotational axes which are arranged parallel to each other, wherein each of said shutter elements comprises at least first and second wings solidly joined together and arranged almost parallel to each other, in a first position of said shutter elements said first and second wings are oriented substantially parallel to an imaginary plane defined by said opening, said first wings of said shutter elements being adjacent one another to form a first wing layer that closes said opening, and said second wings of said shutter elements being adjacent one another to form a second wing layer that also closes said opening, a closed air space being thus formed between said first and second wing layer, and in a second position of said shutter elements said first and second wings are substantially normal to said imaginary plane, thus clearing said opening.

8. An internal combustion engine according to claim 7, wherein said combustion engine is provided with several openings which are each closed by a said shutter assembly.

9. A shutter assembly for use with an opening leading to an internal combustion engine comprising pivotal shutter elements having rotational axes which are arranged parallel to each other, wherein each of said shutter elements comprises at least first and second wings solidly joined together and arranged almost parallel to each other, in a first position of said shutter elements said first and second wings are oriented substantially parallel to an imaginary plane defined by said opening, said first wings of said shutter elements being adjacent one another to form a first wing layer that closes said opening, and said second wings of said shutter elements being adjacent one another to form a second wing layer that also closes said opening, a closed air space being thus formed between said first and second wing layer, and in a second position of said shutter elements said first and second wings are substantially normal to said imaginary plane, thus clearing said opening, wherein in said second position, said first wing of one shutter element is situated adjacent said second wing of a neighboring shutter element.

* * * * *